(12) United States Patent
Gibb et al.

(10) Patent No.: US 9,995,325 B2
(45) Date of Patent: Jun. 12, 2018

(54) LOCKING CLAMP

(71) Applicant: Formetco, Inc., Duluth, GA (US)

(72) Inventors: John D. Gibb, Buford, GA (US); Jonathon Christopher Adams, Hoschton, GA (US); Brian David Jeffries, Duluth, GA (US); Robert Lee Franklin, Snellville, GA (US)

(73) Assignee: Formetco, Inc., Duluth, GA (US)

( * ) Notice: Subject to any disclaimer, the term of this patent is extended or adjusted under 35 U.S.C. 154(b) by 0 days. days.

(21) Appl. No.: 15/457,691

(22) Filed: Mar. 13, 2017

(65) Prior Publication Data

US 2017/0261018 A1    Sep. 14, 2017

Related U.S. Application Data

(60) Provisional application No. 62/306,957, filed on Mar. 11, 2016.

(51) Int. Cl.
*F16B 2/18*       (2006.01)
*F16B 2/00*       (2006.01)
(Continued)

(52) U.S. Cl.
CPC .............. *F16B 2/185* (2013.01); *F16B 2/005* (2013.01); *F16B 2/10* (2013.01); *F16B 2/22* (2013.01); *G09F 7/18* (2013.01); *G09F 15/0018* (2013.01); *G09F 15/0025* (2013.01); *G09F 2007/1839* (2013.01); *G09F 2015/0093* (2013.01); *Y10T 24/3429* (2015.01); *Y10T 24/44521* (2015.01)

(58) Field of Classification Search
CPC .... F16B 2/185; F16B 2/10; F16B 2/22; G09F 15/0018; G09F 2007/1839; Y10T 24/44521; Y10T 24/44496; Y10T 24/3429
See application file for complete search history.

(56) References Cited

U.S. PATENT DOCUMENTS 2,837,806 A * 6/1958 Hawie ................. A41F 1/00
24/328
3,531,835 A * 10/1970 Paikin ................. A41F 1/00
24/516

(Continued)

OTHER PUBLICATIONS

Gibb, John D.; International Search Report and Written Opinion for PCT Application Serial No. PCT/US17/22177, filed Mar. 13, 2017, dated Jun. 9, 2017, 6 pgs.

*Primary Examiner* — Robert Sandy
*Assistant Examiner* — Michael S Lee
(74) *Attorney, Agent, or Firm* — Kean Decarlo; Womble Bond Dickinson (US) LLP

(57) ABSTRACT

A locking clamp for use in a cable system for stretching a sheet across a surface and maintaining it under tension, the locking clamp having a base member defining a first grasping surface; an elongate tongue member rotatively coupled to a first portion of the base member and defining a second grasping surface, and a locking member that is rotatively coupled to a second portion of the base member and that is configured to selectively rotate the tongue member to urge at least a portion of the second grasping surface of the tongue member into engageable contact with the first grasping surface of the base member. The base member of the locking clamp also has a hook configured to removably engage a cable of a tensioning system.

39 Claims, 11 Drawing Sheets

(51) Int. Cl.
  *F16B 2/10* (2006.01)
  *F16B 2/22* (2006.01)
  *G09F 15/00* (2006.01)
  *G09F 7/18* (2006.01)

(56) References Cited

U.S. PATENT DOCUMENTS

| | | | | |
|---|---|---|---|---|
| 3,757,393 | A | * | 9/1973 | Bucheli .................. A63H 33/06 446/85 |
| 3,842,394 | A | * | 10/1974 | Bolduc ................ A61B 5/0416 439/261 |
| 4,463,482 | A | * | 8/1984 | Hawie ....................... A41F 3/02 24/489 |
| 4,733,988 | A | * | 3/1988 | Kelly ........................ F16B 2/10 24/327 |
| 4,788,723 | A | * | 12/1988 | Doelfel .................. A41F 9/007 2/236 |
| 5,410,783 | A | * | 5/1995 | Stoelinga .................. B42F 1/02 24/511 |
| 5,975,618 | A | * | 11/1999 | Rippberger .............. B60J 7/104 248/316.6 |
| 9,073,495 | B2 | * | 7/2015 | Toutant ................... B60R 13/01 |
| 2001/0023549 | A1 | * | 9/2001 | Geiberger ............ A47G 1/0611 40/793 |
| 2004/0168286 | A1 | | 9/2004 | Herman |
| 2004/0237365 | A1 | | 12/2004 | Johansson |
| 2008/0250613 | A1 | | 10/2008 | Franklin |
| 2010/0199536 | A1 | | 8/2010 | Knight |
| 2010/0239383 | A1 | * | 9/2010 | Toutant ................... B60R 13/01 410/77 |
| 2016/0143426 | A1 | * | 5/2016 | Bazan ..................... A45F 5/021 224/271 |
| 2016/0349008 | A1 | * | 12/2016 | Darby ....................... A45F 5/02 |

\* cited by examiner

LOCKING CLAMP

FIELD OF THE INVENTION

The present disclosure relates generally to locking clamps and more particularly to locking clamps configured to selectively holding the perimeter edges of a flexible sheet and for stretching the flexible sheet to maintain a generally flat surface for displaying a printed advertising message in a tensioned or stretched condition on a billboard or similar flat backing surface.

BACKGROUND

Large printed vinyl sheets have generally replaced pasted paper signs in the outdoor advertising industry. Conventional Installation of large printed vinyl display sheets requires two or more workers who typically push light weight fiberglass or similar non-conductive rods through pockets that are heat-sealed in each of the four end surfaces of a sheet, which forms the advertising or display face of a billboard.

The vinyl sheets typically have to be hung from the top of a billboard after the top rods are secured to the billboard frame and then are pulled or tensioned horizontally and vertically across the metal backing of the billboard. Generally the installation process requires at least two workers who take on average approximately 20 to 30 minutes or more to complete an installation.

For cost savings, the outdoor advertising industry continues to develop lighter weight flexible materials similar to vinyl or polyethylene display sheets, which can be recycled and cost less but are not as strong as the historical vinyl display sheets. Lighter weight vinyl or polyethylene display sheets have less strength and generally make the light weight vinyl or polyethylene display sheets unsuitable for heat-sealing pockets and are more subject to tearing from excess tensioning and repeated installations and removals.

It would be desirable to have a clamp that could be selectively attached to a cable running horizontally and vertically along the perimeter of a billboard or display surface, which will minimize or eliminate twisting and wrinkling of the display sheet.

It would be further desirable to have a clamp that would allow application to a cable running parallel to the face of the clamp and which clamp would remain attached to the cable while one display sheet is removed and another installed in its place.

It would be further desirable to have a clamp that could be retained on the cable when a sheet is being dismounted, remounted or when the clamp is not in use so that the clamp is not dropped or lost.

It would be further desirable to have a clamp that will allow for selective engagement to the sheet.

It would be also be desirable to have a clamp that could be selectively retained on the cable during sheet change out.

It would also be desirable to have a clamp that can be inserted directly onto the cable without the need to twist and turn the cable over, under or around legs or prongs on the clamp to lock the cable in place on the clamp, which is difficult and time consuming on more rigid cables.

SUMMARY

Described herein is a locking clamp and a method of using a locking clamp in a cable tensioning system. In one aspect, the locking clamp for use in a cable tensioning system can comprise a base member defining a first grasping surface, an elongate tongue member rotatively coupled to a first portion of the base member and defining a second grasping surface, and a locking member that is rotatively coupled to a second portion of the base member and that is configured to selectively rotate the tongue member to urge at least a portion of the second grasping surface of the tongue member into contact with the first grasping surface of the base member. In another aspect, the base member of the locking clamp further comprises a means for selectively coupling or receiving a portion of a cable in the cable tensioning system.

Various implementations described in the present disclosure can include additional systems, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DESCRIPTION OF THE FIGURES

The features and components of the following figures are illustrated to emphasize the general principles of the present disclosure. Corresponding features and components throughout the figures can be designated by matching reference characters for the sake of consistency and clarity.

FIG. 9A illustrating the locking clamp in an unlocked position and FIG. 9B illustrating the locking clamp in a locked position.

FIG. 10A illustrating the licking clamp in an unlocked position and FIG. 10B illustrating the locking clamp in a locked position.

FIGS. 11A and 11B are cross-sectional views of an alternative embodiment of the locking clamp. FIG. 11A illustrating the licking clamp in an unlocked position and FIG. 11B illustrating the locking clamp in a locked position.

FIG. 12A illustrating the licking clamp in an unlocked position and FIG. 12B illustrating the locking clamp in a locked position.

FIG. 13A illustrating the licking clamp in an unlocked position and FIG. 13B illustrating the locking clamp in a locked position.

FIG. 14A illustrating the licking clamp in an unlocked position and FIG. 14B illustrating the locking clamp in a locked position.

FIG. 15A illustrating the licking clamp in an unlocked position and FIG. 15B illustrating the locking clamp in a locked position.

DETAILED DESCRIPTION

Figure 1:
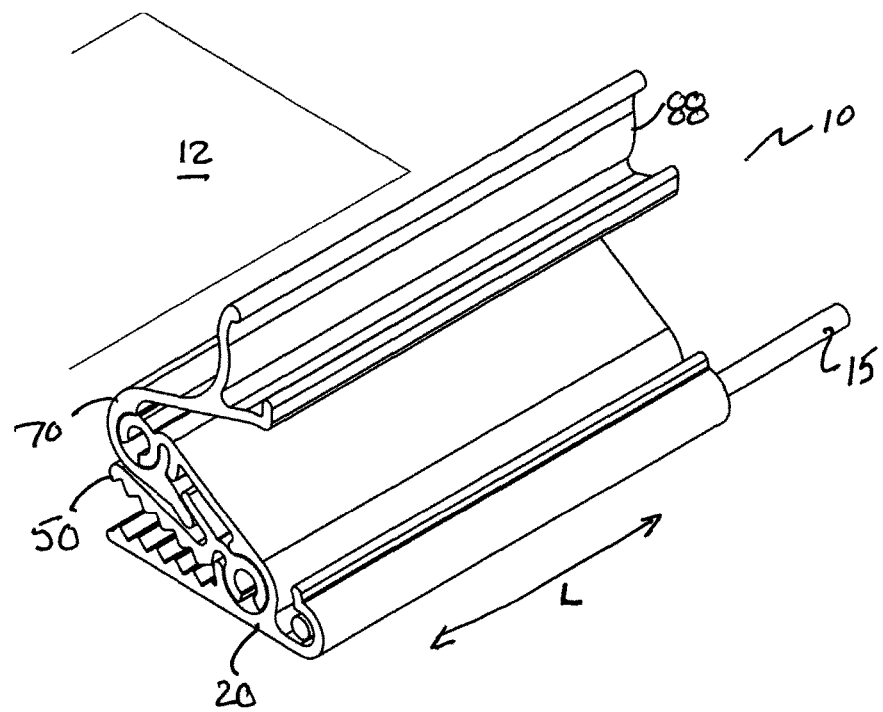
FIG. 1 is a perspective view of a locking clamp in an unlocked position, in which the distal contact end of a locking member is not in contact with a top surface of a distal end portion of a tongue member, and showing a portion of a vinyl sheet being schematically drawn toward a working space between respective first and second grasping surfaces of the respective base and tongue members, also showing a cable positioned in contact with a portion of the base member.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

For clarity, it will be appreciated that this disclosure will focus primarily on the end or cross-sectional views of a locking clamp. As such, it is contemplated that the described cross-section features of the elements forming the locking clamp can also extend the elongate longitudinal length of the respective elements such as, for example and without limitation, the base member, the tongue member and the locking member.

As used throughout, the singular forms "a," "an" and "the" include plural referents unless the context clearly dictates otherwise. Thus, for example, reference to "a grasping surface" can include two or more such surfaces unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "can," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular embodiment.

Disclosed are components that can be used to perform the disclosed methods and systems. These and other components are disclosed herein, and it is understood that when combinations, subsets, interactions, groups, etc. of these components are disclosed that while specific reference to each various individual and collective combinations and permutation of these cannot be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems can be understood more readily by reference to the following detailed description of preferred embodiments and the examples included therein and to the Figures and their previous and following description.

Described herein is a locking clamp 10 and a method of using a locking clamp in a cable tensioning system. In a typical installation, a cable 15 is hung on slides and pulleys along the four corners and four sides of a billboard face, hidden from view by the face frame. It is contemplated that a plurality of locking clamps can be attached to the display sheet, which is typically formed from polyethylene or light weight vinyl, at selected spaced intervals, such as, for example and not meant to be limiting, approximately 2-3 feet apart. Each locking clamp 10 can selectively grasp a portion of the sheet and can be configured to hold a portion of the sheet under tension. Each locking clamp 10 comprises a hook that defines a channel or guideway through which a portion of a tensioning cable can pass. For the purposes of the present disclosure, the cable may refer to a portion of the cable, as the context reflects. As tension is increased on the cable by means of a conventional spring-loaded single arm locking mechanism or other tensioning mechanism known to those skilled in the art, the tension on the display sheet can be selectively increased to result in an overall flat, undistorted display sheet. When the display sheet is subsequently removed or replaced with another display sheet, the clamps can remain attached to the cable which can facilitate installation of a new display sheet and preventing the disengagement of one or both clamp plates from the cable. An example of a cable tensioning system is disclosed in U.S. Pat. Nos. 7,836,562, 8,020,260, 8,042,292, and 8,371,002, which applications are commonly assigned to the assignee of the present application and which are hereby incorporated in their entirety by reference.

Figure 2:
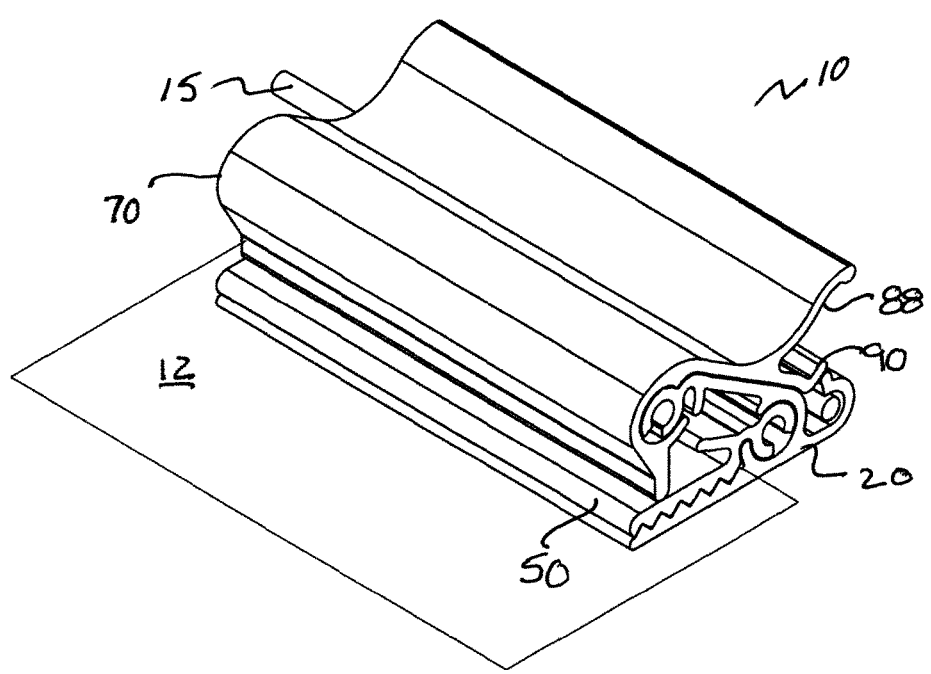
FIG. 2 is a perspective view of a locking clamp of FIG. 1 in a locked position, in which the distal end of the locking member is in contact with the a portion of the top surface of the of the distal end portion of the tongue member and the tongue member is urged to the closed position in which at least a portion of the second grasping surface of the tongue member is in contact with at least a portion of the first grasping surface of the base member thereby securely grasping a portion of a vinyl sheet therebetween the respective first and second grasping surfaces.
Figure 3:
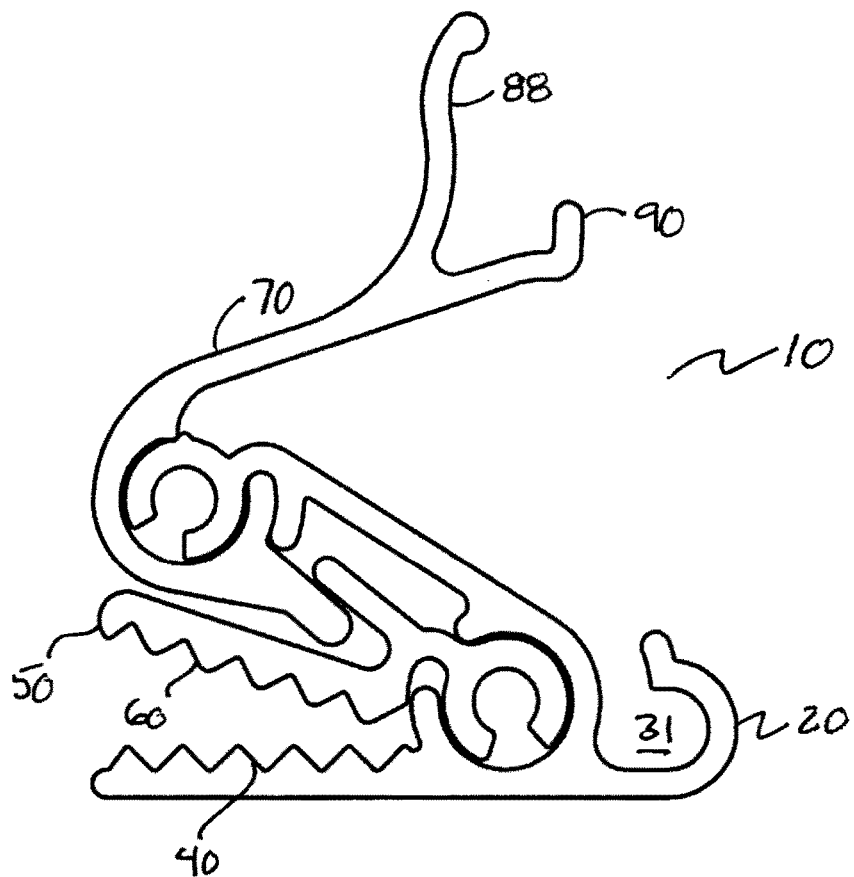
FIG. 3 is a cross-sectional view of the locking clamp of FIG. 1 in the unlocked position, showing the tongue member being selectively rotatively moved relative to the bottom armature to an open position in which the second grasping surface of the tongue member is spaced from the first grasping surface of the base member.
Figure 4:
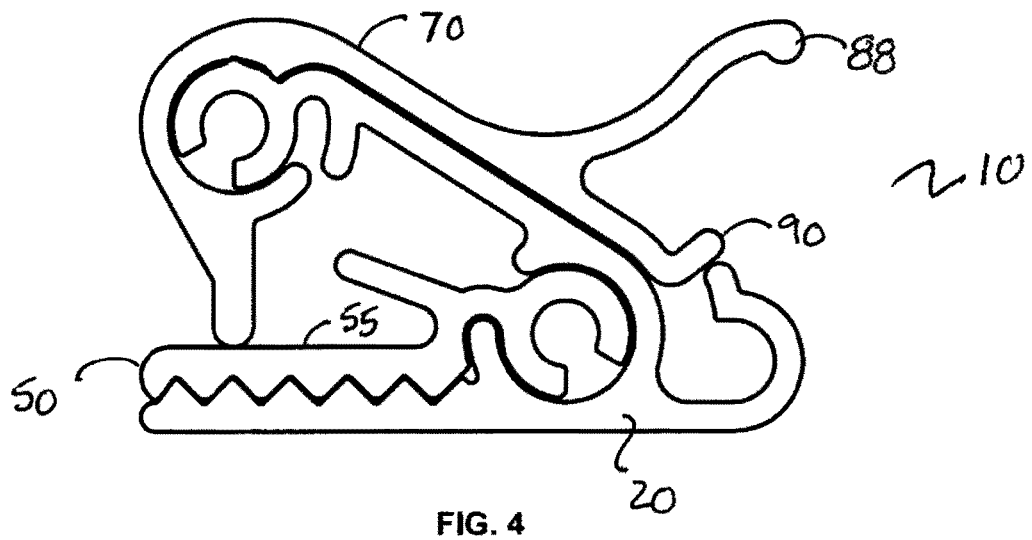
FIG. 4 is a cross-sectional view of the locking clamp of FIG. 2 in the locked position, showing the tongue member being selectively rotatively moved relative to the bottom armature to an closed position in which at least a portion of the second grasping surface of the tongue member is in contact with or otherwise into engagement with at least a portion of the first grasping surface of the base member to securely grasp a portion of a vinyl sheet therebetween the respective first and second grasping surfaces.
Figure 5:
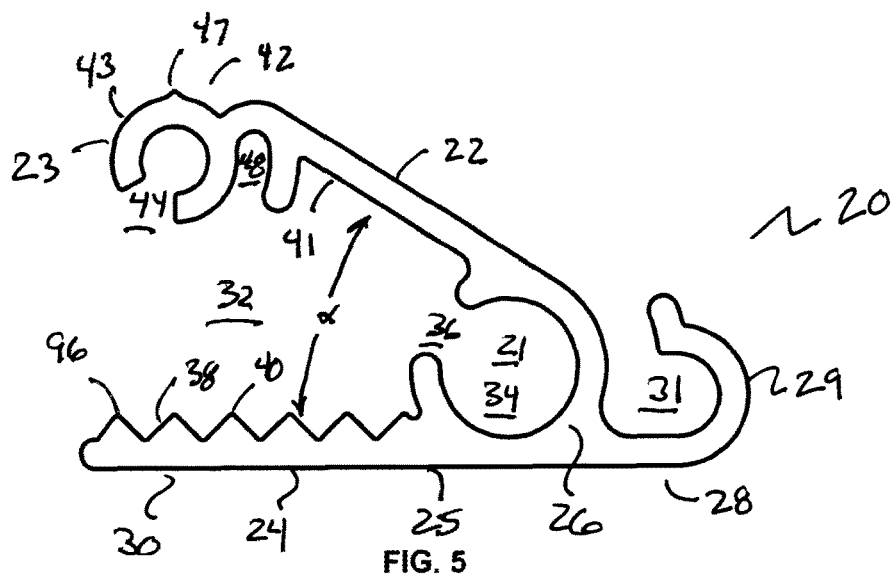
FIG. 5 is a cross-sectional view of a base member of the locking clamp of FIG. 1.
Figure 6:
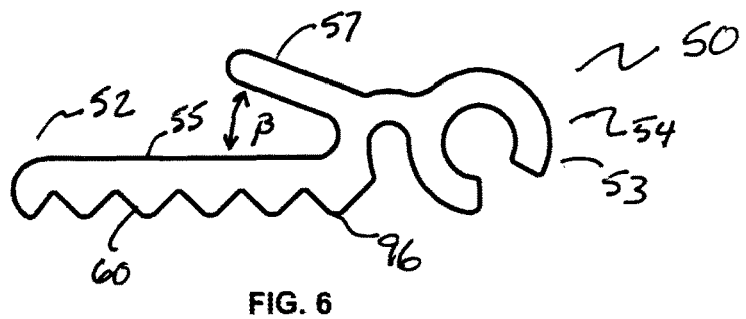
FIG. 6 is a cross-sectional view of a tongue member of the locking clamp of FIG. 1.
Figure 7:
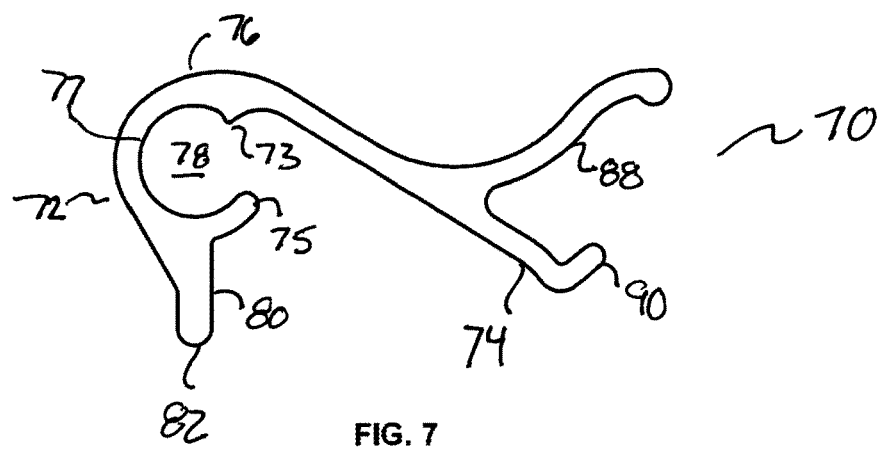
FIG. 7 is a cross-sectional view of a locking member of the locking clamp of FIG. 1.

FIGS. 1 and 2 illustrate one exemplary aspect of the present disclosure and show an assembled locking clamp 10 in an unlocked position and a locked position engaging a sheet 12 and a cable 15. The cable 15 generally surrounds a billboard frame. The locking clamp 10 generally comprises a base member 20, a tongue member 50, and a locking member 70. The locking clamp 10 may be made of materials that provide the strength required to sustain constant tensioning pressure and withstand long-term outdoor exposure to heat, cold, sun, rain, and non-atmospheric conditions such as excessive installation pressure, tensioning pressure, and corrosive elements. Thus, for example and without limitation, it is contemplated that the locking clamps 10 can be formed from suitable polymers, plastic, metal, alloy, ceramic, wood, combinations and mixtures thereof, and the like. It is also contemplated that the base member 20, tongue member 50, and locking member 70 can be made of the same or different materials. In one exemplary aspect, it is contemplated that the respective base, tongue, and locking members 20, 50, 70 can be extruded conventionally to the desired operative longitudinal length or extruded to a desired longitudinal length and then cross-sectional cut to the desired operative longitudinal length.

Figure 8:
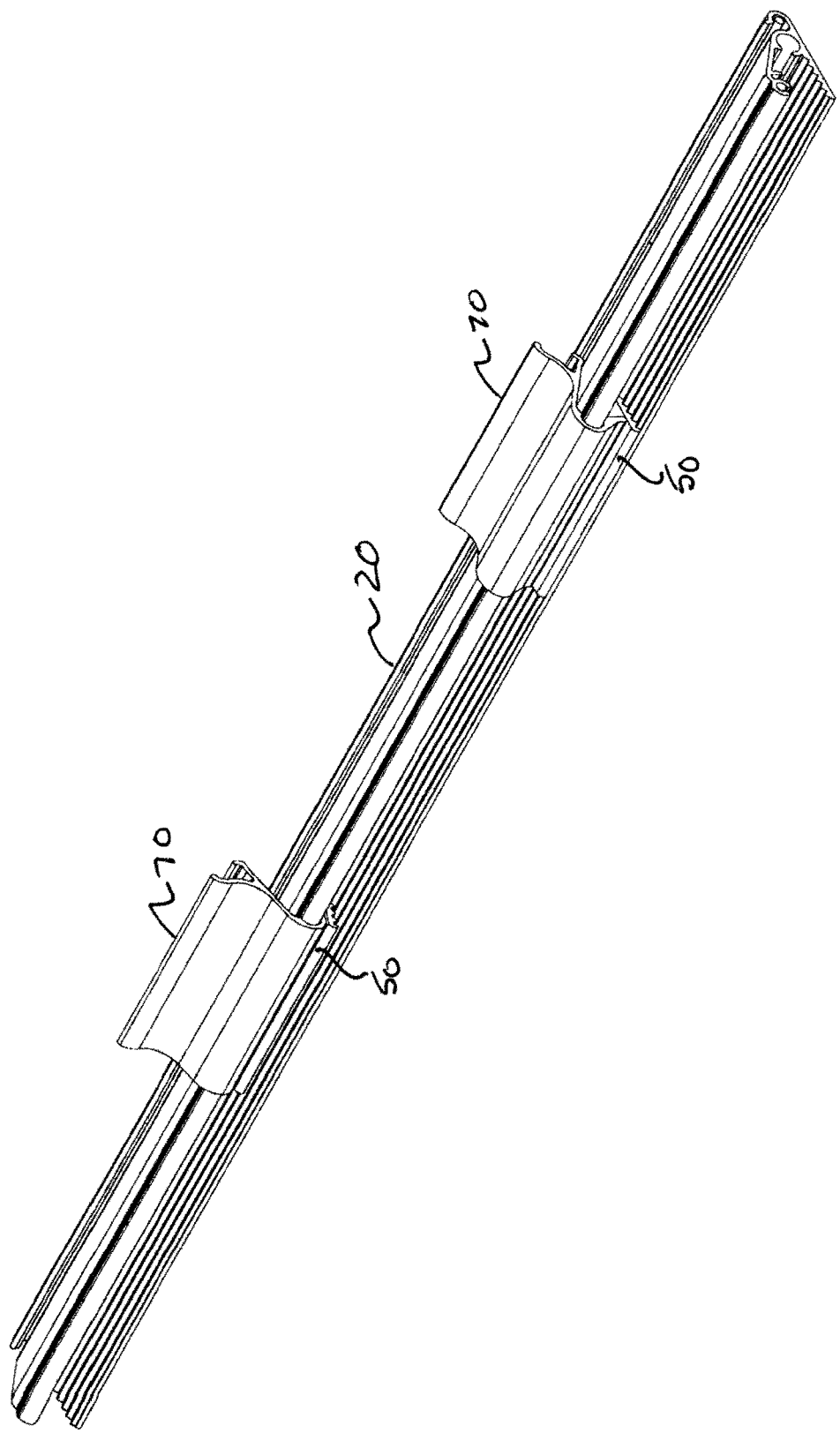
FIG. 8 is a perspective view of a base member with an extended longitudinal length and respective pairs of like sized tongue and locking members spaced as desired along the respective elongate longitudinal length of the base member to form a plurality of locking clamps formed on the single base member.
Figure 9A:
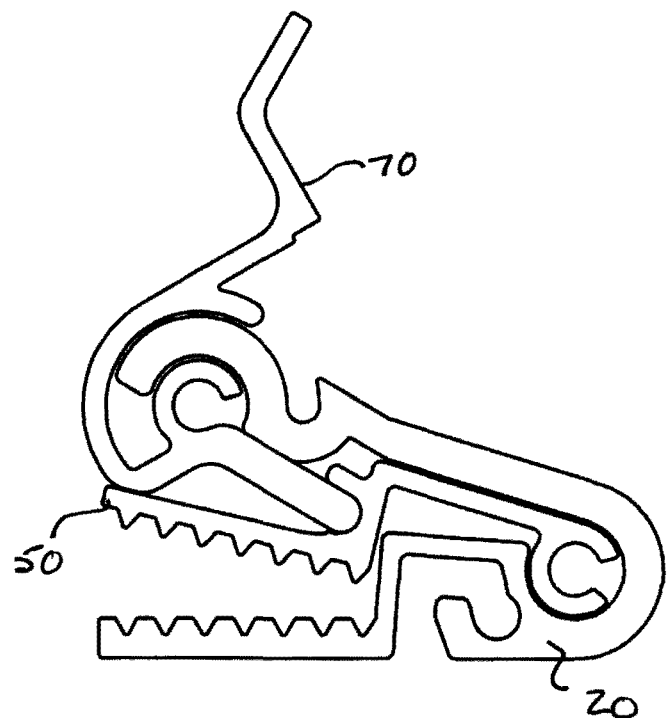
FIGS. 9A and 9B are cross-sectional views of an alternative embodiment of the locking clamp.
Figure 9B:
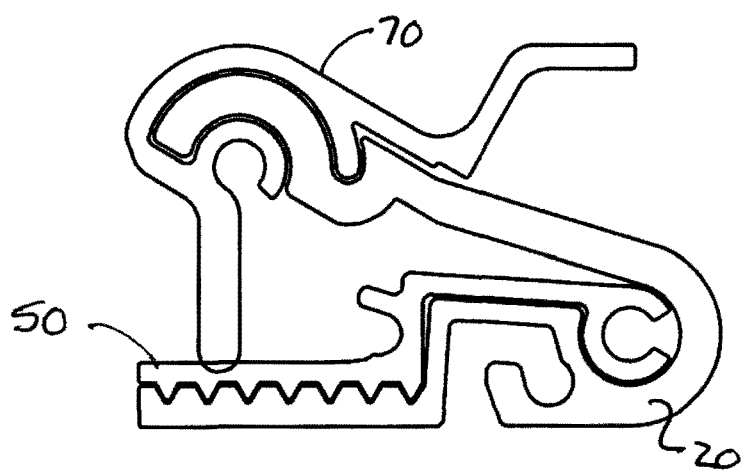
Figure 10A:
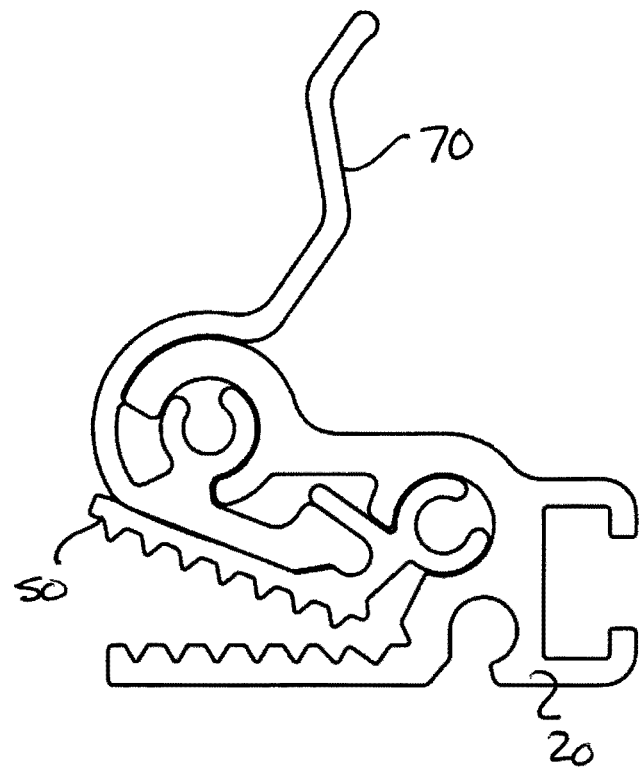
FIGS. 10A and 10B are cross-sectional views of an alternative embodiment of the locking clamp.
Figure 10B:
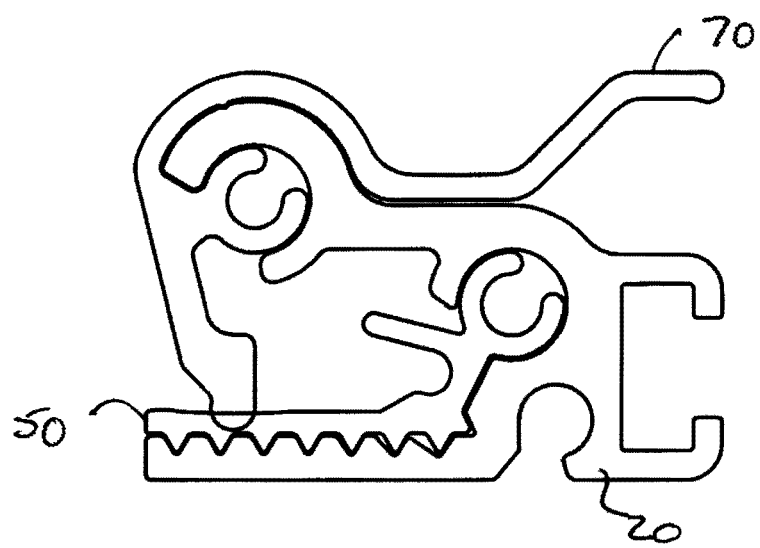
Figure 11A:
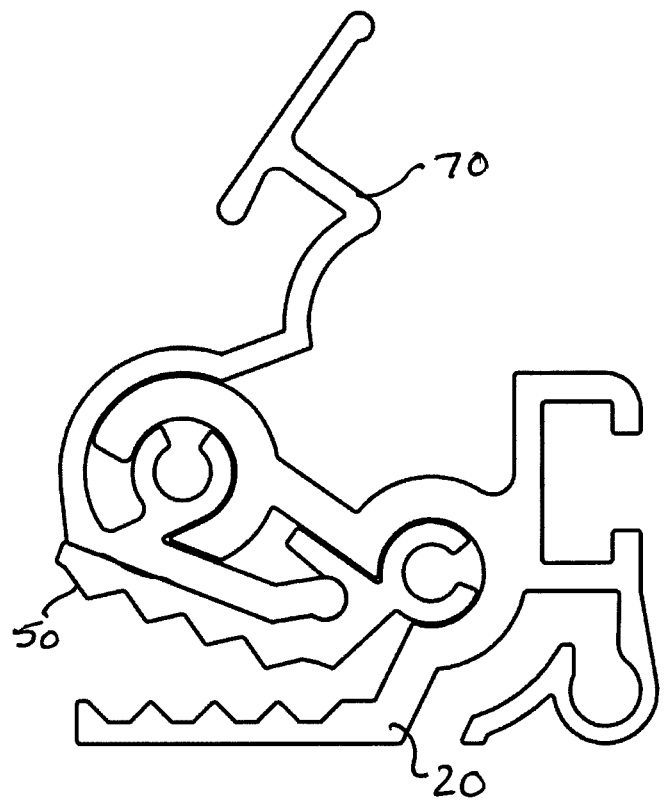
Figure 11A:
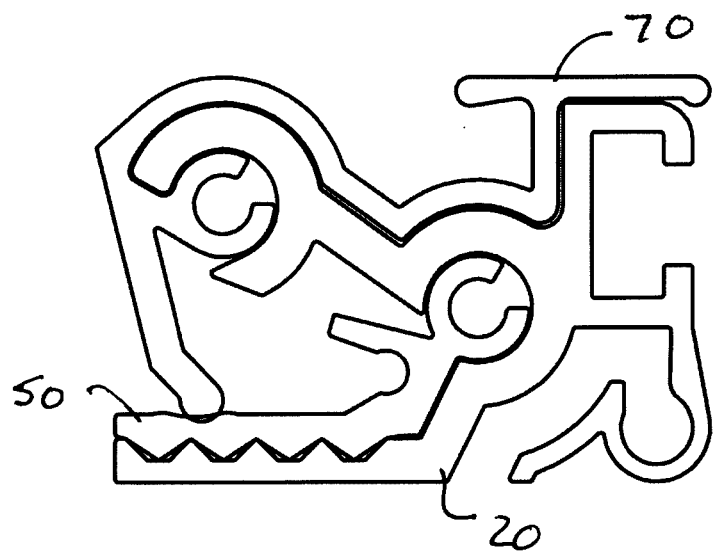
Figure 12A:
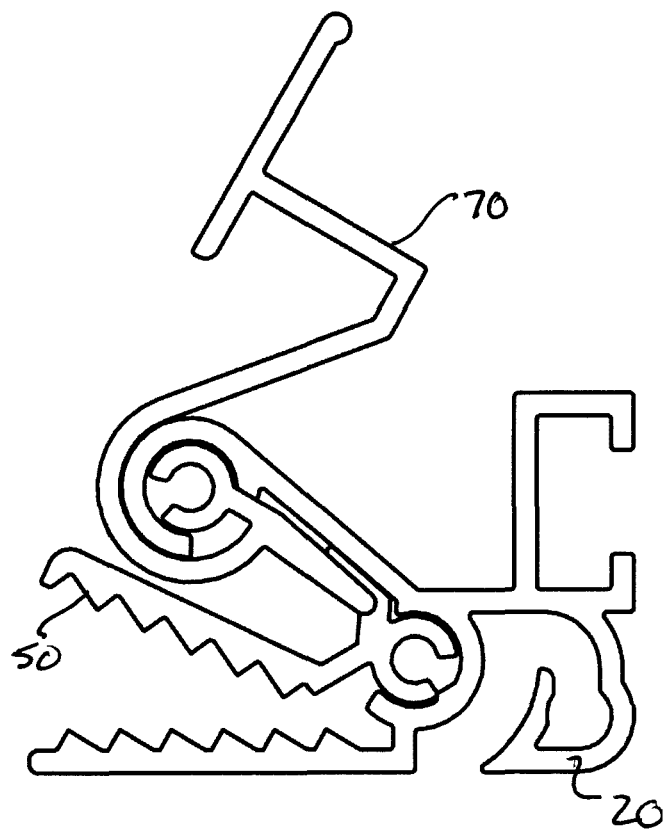
FIGS. 12A and 12B are cross-sectional views of an alternative embodiment of the locking clamp.
Figure 12B:
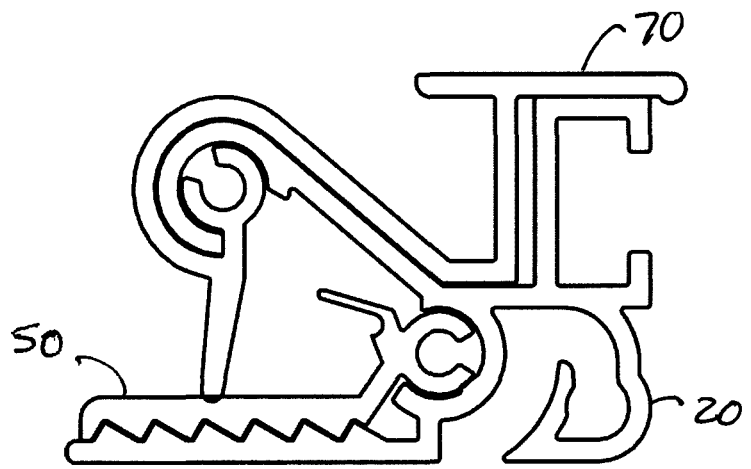
Figure 13A:
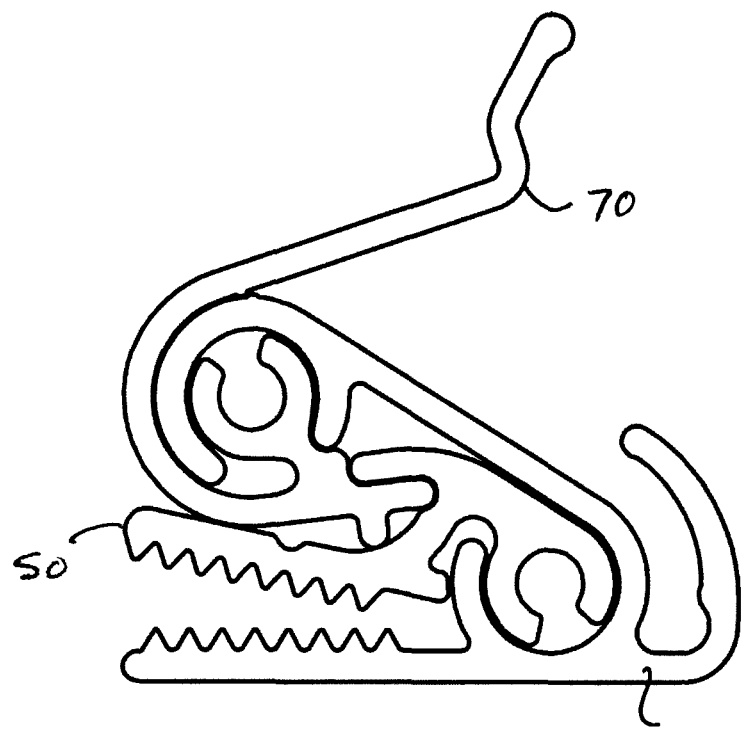
FIGS. 13A and 13B are cross-sectional views of an alternative embodiment of the locking clamp.
Figure 13B:
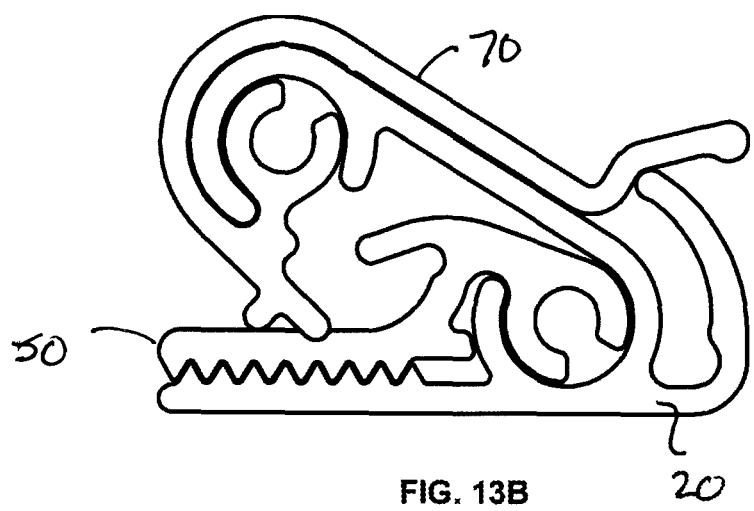
Figure 14A:
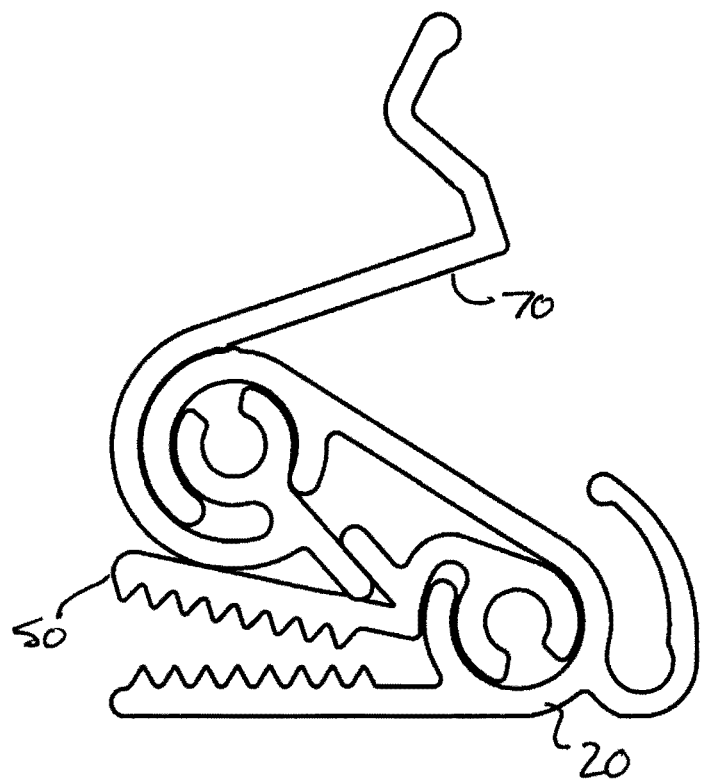
FIGS. 14A and 14B are cross-sectional views of an alternative embodiment of the locking clamp.
Figure 14B:
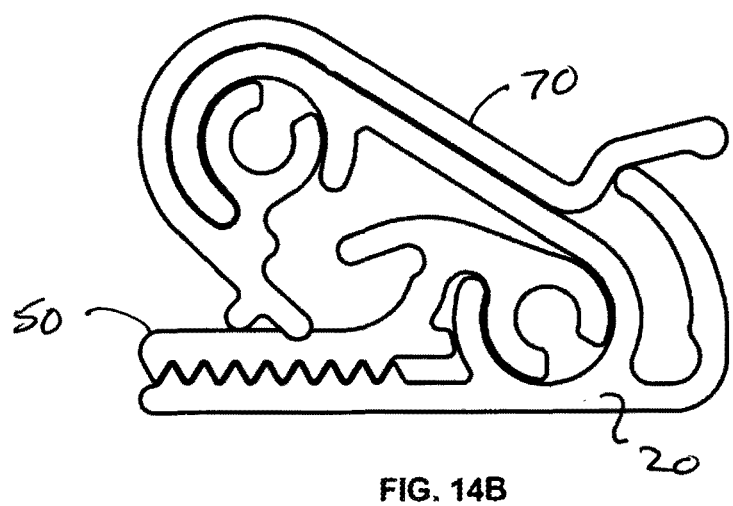
Figure 15A:
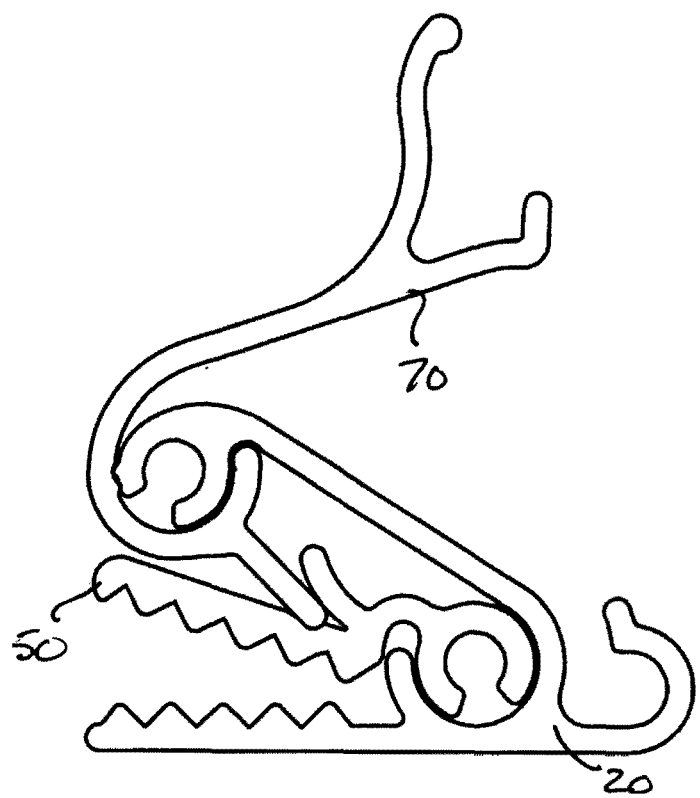
FIGS. 15A and 15B are cross-sectional views of an alternative embodiment of the locking clamp.
Figure 15B:
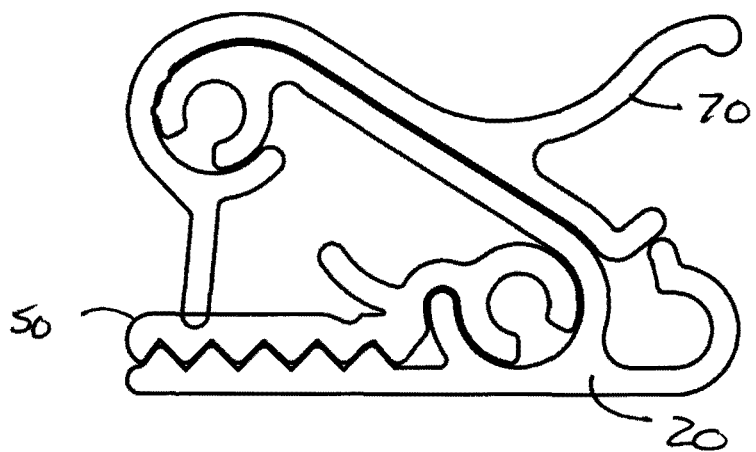

It is also contemplated that the base member 20, tongue member 50, and locking member 70 can be formed to have desired elongated longitudinal lengths. In one aspect, the base member 20, tongue member 50, and locking member 70 can be formed to have substantially the same elongated longitudinal lengths, thereby forming a locking clamp having a substantially uniform longitudinal length. In a further aspect, and as exemplarily shown in FIG. 8, at least one of the base member 20, tongue member 50, and locking member 70 can be formed to have a different longitudinal length. In this exemplary aspect, the base member 20 has an extended longitudinal length, and respective pairs of like sized tongue and locking member 50, 70 are spaced as desired along the respective elongate longitudinal length of the base member to form a plurality of locking clamps formed on the single base member.

In one aspect, the locking clamp 10 for use in a cable tensioning system can comprise a base member 20 defining a first grasping surface 40, an elongate tongue member 50 rotatively coupled to a first portion 21 of the base member 20 and defining a second grasping surface 60, and a locking member 70 that is rotatively coupled to a second portion 23 of the base member and that is configured to selectively rotate the tongue member to urge at least a portion of the second grasping surface 60 of the tongue member into contact with the first grasping surface 40 of the base member. In another aspect, the base member 20 of the locking clamp 10 further comprises a means for selectively coupling to a portion of a cable in the cable tensioning system.

In one aspect, the base member 20 of the locking clamp 10 can comprise a top elongate armature 22 and a bottom elongate armature 24. The bottom armature 24 is integrally connected to the top armature 22 at a juncture 26 that is intermediate a proximal end portion 28 and a distal end portion 30 of the bottom armature. As shown, the bottom armature 24 is positioned at an acute angle α relative to the top armature 22 and has a substantially "V" shape. One skilled in the art will appreciate that this V shape allows the base member to function as a spring in that the top armature 22 will resist bias movement away from the bottom armature that increases the angular relationship between the respective top and bottom armatures. In another aspect, the V shape between the respective top and bottom armatures also defines a working space 32 therebetween the respective top and bottom armatures. In a further aspect, the juncture defines a semi-circular opening 34 in cross-section that further defines an angular gap 36 that is oriented toward the working space 32.

In one aspect, at least a portion of a top surface 38 of the distal end portion of the bottom armature 24 can define a first grasping surface 40. Optionally, it is also contemplated that a bottom surface 25 of the bottom armature can be substantially planar in cross-sectional view. In a further aspect, the proximal end portion 28 of the base member 20 can have a hook shape 29 in cross-section that defines a channel 31 or guideway through which a portion of a tensioning cable 15 can pass. Optionally, the proximal end portion 28 of the base member 20 can further comprise other cross-sectional shapes that are configured to selectively couple to conventional tensioning means.

In a further aspect, the top armature 22 of the base member 20 extends outwardly from the juncture 26 to a key end 42 that has a semi-circular ring shape in cross-section that defines an angular gap 44 that is oriented toward the distal end portion 30 of the bottom armature. Optionally, the top armature 22 can further have a shoulder member 46 that extends from an inward surface of the top armature 22 toward the distal end portion 30 of the bottom armature. As shown in the figures, the shoulder member and a portion of the key end define a guide channel 48.

The elongate tongue member 50 can comprise a distal end portion 52 and a proximal end portion 54. In one aspect, at least a portion of a bottom surface 56 of the distal end portion 52 of the tongue member 50 defines a second grasping surface 60. Optionally, it is also contemplated that a top surface 55 of the distal end portion of the tongue member 50 can be substantially planar in cross-sectional view. In another aspect, the proximal end portion 52 of the tongue member 50 can have a semi-circular ring structure 53 in cross-section that is configured for rotative mounting therein the semi-circular opening 34 defined in the juncture 26 of the base member 20. In this aspect, the tongue member 50 can be selectively rotatively moved relative to the bottom armature 24 of the base member about and between an open position, in which the second grasping surface 60 of the tongue member 50 is spaced from the first grasping surface 40 of the base member 20, and a closed position, in which at least a portion of the second grasping surface 60 of the tongue member is in contact with or otherwise positioned in operative engaging relationship with at least a portion of the first grasping surface 40 of the base member. It is contemplated that the angular rotative movement of the tongue member 50 relative to the base member 20 can be further regulated by portions of the elongate tongue member adjacent the ring structure 53 impacting the respective opposing edges of the angular gap 36 defined in the juncture 26 of the base member.

In a further optional aspect, the tongue member 50 can further have a male protrusion 57 that extends toward the distal end portion 52 from a top surface 55 of the tongue member near the proximal end portion 54. In this aspect, the male protrusion 57 extends at an acute angle β relative to the top surface 55 of the distal end portion 52 of the tongue member into the workspace 32.

The locking member 70 can comprise a fore portion 72 and a rear portion 74. In one aspect, the fore portion 72 of the locking member 70 can have a semi-circular ring structure 76 in cross-section that defines a semi-circular opening 78 that is configured for rotational movement about an outer surface 43 of the key end 42 of the top armature 22 of the base member. In this aspect, the fore portion 72 can also comprises an elongate actuation member 80 that extends outwardly from a portion of the semi-circular ring structure 76 to a distal contact end 82. It is contemplated that the locking member 70 can be selectively movable from an unlocked position, in which the distal contact end 82 of the actuation member 80 is not in contact with the top surface 55 of the distal end portion 52 of the tongue member, and a locked position, in which the distal contact end 82 of the actuation member 80 is in contact with the a portion of the top surface 55 of the of the distal end portion 52 of the tongue member and the tongue member is urged to the closed position. Optionally, it is further contemplated, that in the locked position, the actuation member 80 will be positioned in an over center orientation with respect to the top surface 55 of the of the distal end portion 52 of the tongue member such that the locking clamp 10, under the bias forces exerted by the operatively coupled base member 20, will be urged to remain in the locked position barring application of external force to the locking member.

In a further aspect, it is contemplated that, as the locking member is selectively rotated away from the locked position to the unlocked position, portions of the actuation member can contact the male protrusion 57 of the tongue member to urge the tongue member from the closed position to the open position. In this aspect, an end portion 75 of the ring structure 53 of the locking member can slide into operative receipt within the guide channel 48 of the base member. In this optional aspect, it is contemplated that, in the fully open position, that the male protrusion 57 can retain the tongue member in the open position and the end portion 75 of the ring structure 53 of the locking member will be fully received within the guide channel 48 of the base member.

In a further optional aspect, the outer surface 43 of the key end 42 can further defines a raised ridge 47 in cross-section that is configured to selectively a complementary raised edge 73 defined in the inner surface 77 of semi-circular ring structure 76. It is contemplated that the respective raised ridge 47 and raised edge 73 will be complementarily positioned relative to each other in an over centered position when the locking member 70 is rotated relative to the key end and reaches the unlocked position. Thus, in the unlocked position, the locking member 70 will be fixed relatively to the key end 42 upon the engagement of the complementary ridge/groove barring application of external force to the locking member.

In another optional aspect, the locking member 70 can comprise an elongate leverage member 88 that extends upwardly and away from the locking member intermediate the respective fore and rear portions. In this aspect, the leverage member 88 is spaced from and overlies the rear portion 74 of the locking member.

In an additional optional aspect, the rear portion 74 of the locking member 70 can define a cap structure 90 that is configured to selectively block the opening defined by the hook 29 of the proximal end portion 28 of the base member 20. In this aspect, when the locking clamp 10 is positioned in the locked position, the cap structure 90 is positioned in contact with a portion of the tip of the hook 29 and selectively encapsulates the channel 31 or guideway through which a portion of a tensioning cable 15 can pass. When the locking clamp 10 is positioned in the unlocked position, the cap structure 90 is spaced away from the hook and the tensioning cable can be selectively removed from the channel 31 or guideway.

In one aspect, free or substantially unimpeded lateral movement of the cable 15 within the channel 31 is preferable for smooth operation of the cable tensioning system. Alternatively, for certain applications, it is contemplated that the cap structure can be configured to exert a friction fit into the channel 31 to form a snug fit over the cable 15. It is also contemplated that the respective shape of the hook 29 and the channel 31 can be modified to accommodate different diameter or shaped cable or other article.

It is contemplated that the grasping surfaces 40, 60 can have a conventional gripping surface that is suitable for grasping the sheet with the desired degree of frictional force. As such, the grasping surfaces can comprise a series of surface irregularities, such as the exemplary illustrated complementary protrusions 96 extending from the respective grasping surfaces 40, 60 (or at least a portion thereof) to provide a friction fit when the locking clamp is in the locked position and the tongue member is biased into the closed position. It is contemplated that the protrusions 96 can be, for example and without limitation, complementary teeth, protrusions, bumps, ribs, ridges, spikes, or the like. Alternatively, for example and without limitation, the protrusions 96 or surface irregularities can be complementary grooves, indentations, channels, detents, divots, or the like.

In assembly and operation, the locking clamp 10 is positioned in the unlocked position and the cable 15 is inserted in the channel 31. Subsequently, a portion of the edge of a display sheet 12 is positioned between the grasping surfaces 40, 60. Hand pressure is generally applied to the leverage member of the locking member to rotate the locking member in a first rotative direction (clockwise in the figures) to selectively urge the tongue member to rotatively move in a second rotative direction (counterclockwise in the figures) from the open to the closed position. When the locking member is position in the locking position, the respective grasping surfaces 40, 60 are in frictional engagement with the portion of the edge of the display sheet and the cap structure 90 of the locking member 70 is positioned in contact with a portion of the tip of the hook 29 to selectively encapsulates the channel 31 or guideway through which a portion of a tensioning cable 15 passes. When tension is applied to the cable, the display sheet 12 is stretched on the face of a billboard along the billboard frame edge.

A single worker can install a display sheet 12 using the described locking clamp 10 with a cable tensioning system.

This is in comparison to conventional systems, which require several workers. The reduction in time to install the display sheet represents a significant time and expense savings to the installation company.

Typically a plurality of locking clamps 10 are engaged with the stretched sheet 12. Conventionally, the cable 15 that extends conventionally around the periphery of the billboard frame. As tension is applied to the cable 15 the display sheet 12 is stretched across the face of the billboard frame holding the display sheet 12 flat with minimal or no twisting, wrinkling, or other distortion.

Optionally, the locking clamp 10 provides the operator the option of attaching the locking clamps 10 to a display sheet 12 off-site in a weather-protected facility. After attaching the locking clamps 10 to the display sheet 12, the worker can transport the sheet 12 to the installation site where the locking clamps 10 are attached to the cable 15 using the hooks of the locking clamps 10.

It is to be understood that the locking clamp 10 of the present disclosure can be used or adapted to be used with other types of systems or be used to grip any suitable type of surface, such as, but not limited to, tent and tarp fabric, paper, film, cotton, wood, ceramic, composite or other natural or synthetic fiber (woven or nonwoven material), combinations of the foregoing and the like. The locking clamp can be adapted to secure relatively inflexible surfaces (such as, but not limited to, metal sheeting, glass, plastic, wood, composites, ceramic, combinations of the foregoing, and the like), such as, for example, by incorporating a rubberized, nonslip, tacky or other friction-type surface on or as part of the grasping surfaces 40, 60.

It should be emphasized that the above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims which follow, they are used only in a generic and descriptive sense, and not for the purposes of limiting the described invention, nor the claims which follow.

What is claimed is:

1. A locking clamp for use in a cable tensioning system having a tensioning cable, the locking clamp comprising:
   a base member comprising a top elongate armature and a bottom elongate armature, wherein the bottom armature has a proximal end portion and a distal end portion, wherein the bottom armature is integrally connected to the top armature at a juncture that is intermediate the proximal end portion and the distal end portion of the bottom armature, wherein the juncture defines a semi-circular opening in cross-section that further defines an angular gap, and wherein at least a portion of a top surface of the distal end portion of the bottom armature defines a first grasping surface;
   an elongate tongue member rotatively coupled to a first portion of the base-member and defining a second grasping surface, and
   a locking member that is rotatively coupled to a second portion of the base member and that is configured to selectively rotate the tongue member to urge at least a portion of the second grasping surface of the tongue member into engageable contact with the first grasping surface of the base member,
   wherein the base member of the locking clamp further comprises a means for selectively coupling to a portion of the tensioning cable.

2. The locking clamp of claim 1, wherein the bottom armature is positioned at an acute angle a relative to the top armature and has a substantially "V" shape.

3. The locking clamp of claim 1, wherein the top armature of the base member extends outwardly from the juncture to a key end that has a semi-circular ring shape in cross-section that defines an angular gap that is oriented toward the distal end portion of the bottom armature.

4. The locking clamp of claim 1, wherein the top armature has a shoulder member that extends from an inward surface of the top armature toward the distal end portion of the bottom armature, and wherein the shoulder member and a portion of the key end define a guide channel.

5. The locking clamp of claim 1, wherein the tongue member comprises a distal end portion and a proximal end portion, wherein at least a portion of a bottom surface of the distal end portion of the tongue member defines the second grasping surface, and wherein the proximal end portion of the tongue member has a semi-circular ring structure in cross-section that is configured for rotative mounting therein the semi-circular opening defined in the juncture of the base member.

6. The locking clamp of claim 5, wherein the tongue member is configured to be selectively rotatively moved relative to the bottom armature of the base member about and between an open position, in which the second grasping surface of the tongue member is spaced from the first grasping surface of the base member, and a closed position, in which at least a portion of the second grasping surface of the tongue member is in contact with or otherwise positioned in operative engaging relationship with at least a portion of the first grasping surface of the base member.

7. The locking clamp of claim 3, wherein the locking member comprises a fore portion and a rear portion, wherein the fore portion of the locking member has a semi-circular ring structure in cross-section that defines a semi-circular opening that is configured for rotational movement about an outer surface of the key end of the top armature of the base member.

8. The locking clamp of, claim 7, wherein the fore portion comprises an elongate actuation member that extends outwardly from a portion of the semi-circular ring structure to a distal contact end.

9. The locking clamp of claim 8, wherein the locking member is selectively movable from an unlocked position, in which the distal contact end of the actuation member is not in contact with the top surface of the distal end portion of the tongue member, and a locked position, in which the distal contact end of the actuation member is in contact with the a portion of the top surface of the of the distal end portion of the tongue member and the tongue member is urged to the closed position.

10. The locking clamp of claim 9, wherein, in the locked position, the actuation member is positioned in an over center orientation with respect to the top surface of the of the distal end portion of the tongue member such that the locking clamp, under the bias forces exerted by the operatively coupled base member, is urged to remain in the locked position barring application of an external force to the locking member.

11. The locking clamp of claim 9, wherein the tongue member has a male protrusion extending toward the distal end portion from a top surface of the tongue member near the proximal end portion.

12. The locking clamp of claim 11, wherein, as the locking member is selectively rotated away from the locked position to the unlocked position, portions of the actuation member contact the male protrusion of the tongue member to urge the tongue member from the closed position to the open position.

13. The locking clamp of claim 7, wherein the outer surface of the key end further defines a raised ridge in cross-section that is configured to selectively a complementary raised edge defined in an inner surface of semi-circular ring structure of the locking member, and wherein the respective raised ridge and raised edge are complementarily positioned relative to each other in an over centered position when the locking member is rotated relative to the key end and reaches the unlocked position.

14. The locking clamp of, claim 7, wherein the locking member further comprises an elongate leverage member that extends upwardly and away from the locking member intermediate the respective fore and rear portions, and wherein the leverage member is spaced from and overlies the rear portion of the locking member.

15. The locking clamp of claim 9, wherein the rear portion of the locking member defines a cap structure that is configured to selectively block the opening defined by the hook of the proximal end portion of the base member.

16. The locking clamp of claim 15, wherein, when the locking clamp is positioned in the locked position, the cap structure is positioned in contact with a portion of the tip of the hook and selectively encapsulates the channel through which a portion of the tensioning cable can pass, and wherein, when the locking clamp is positioned in the unlocked position, the cap structure is spaced away from the hook and the tensioning cable can be selectively removed from the channel.

17. The locking clamp of claim 1, wherein the respective base, tongue, and locking members have the same desired operative longitudinal length.

18. The locking clamp of claim 1, wherein at least one of the base member, tongue member, and locking member can be formed to have a different operative longitudinal length.

19. The locking clamp of claim 18, wherein the base member has a different operative longitudinal length than the operative longitudinal length of the tongue member and locking member.

20. A locking clamp for use in a cable tensioning system having a tensioning cable, the locking clamp comprising:
a base member comprising a top elongate armature and a bottom elongate armature, wherein the bottom armature has a proximal end portion and a distal end portion, wherein the bottom armature is integrally connected to the top armature at a juncture that is intermediate the proximal end portion and the distal end portion of the bottom armature, wherein the top armature has a shoulder member that extends from an inward surface of the top armature toward the distal end portion of the bottom armature, wherein the shoulder member and a portion of the key end define a guide channel, and wherein at least a portion the base member defines a first grasping surface;
an elongate tongue member rotatively coupled to a first portion of the base member and defining a second grasping surface, and
a locking member that is rotatively coupled to a second portion of the base member and that is configured to selectively rotate the tongue member to urge at least a portion of the second grasping surface of the tongue member into engageable contact with the first grasping surface of the base member,
wherein the base member of the locking clamp further comprises a means or selectively coupling to a portion of the tensioning cable.

21. The locking clamp of claim 20, wherein at least a portion of a top surface of the distal end portion of the bottom armature defines the first grasping surface.

22. The locking clamp of claim 20, wherein the juncture defines a semi-circular opening in cross-section that further defines an angular gap and wherein the bottom armature is positioned at an acute angle a relative to the top armature and has a substantially "V" shape.

23. The locking clamp of claim 20, wherein the top armature of the base member extends outwardly from the juncture to a key end that has a semi-circular ring shape in cross-section that defines an angular gap that is oriented toward the distal end portion of the bottom armature.

24. The locking clamp of claim 20, wherein the tongue member comprises a distal end portion and a proximal end portion, wherein at least a portion of a bottom surface of the distal end portion of the tongue member defines a second grasping surface, and wherein the proximal end portion of the tongue member has a semi-circular ring structure in cross-section that is configured for rotative mounting therein the semi-circular opening defined in the juncture of the base member, and wherein the tongue member is configured to be selectively rotatively moved relative to the bottom armature of the base member about and between an open position, in which the second grasping surface of the tongue member is spaced from the first grasping surface of the base member, and a closed position, in which at least a portion of the second grasping surface of the tongue member is in contact with or otherwise positioned in operative engaging relationship with at least a portion of the first grasping surface of the base member.

25. The locking clamp of claim 24, wherein the locking member comprises a fore portion and a rear portion, wherein the fore portion of the locking member has a semi-circular ring structure in cross-section that defines a semi-circular opening that is configured for rotational movement about an outer surface of the key end of the top armature of the base member, wherein the fore portion comprises an elongate actuation member that extends outwardly from a portion of the semi-circular ring structure to a distal contact end, and wherein the locking member is selectively movable from an unlocked position, in which the distal contact end of the actuation member is not in contact with the top surface of the distal end portion of the tongue member, and a locked position, in which the distal contact end of the actuation member is in contact with the a portion of the top surface of the of the distal end portion of the tongue member and the tongue member is urged to the closed position.

26. The locking clamp of claim 24, wherein, in the locked position, the actuation member is positioned in an over center orientation with respect to the top surface of the of the distal end portion of the tongue member such that the locking clamp, under the bias forces exerted by the operatively coupled base member, is urged to remain in the locked position barring application of an external force to the locking member.

27. The locking clamp of claim 25, wherein the tongue member has a male protrusion extending toward the distal end portion from a top surface of the tongue member near the proximal end portion, and wherein, as the locking member is selectively rotated away from the locked position to the unlocked position, portions of the actuation member contact the male protrusion of the tongue member to urge the tongue member from the closed position to the open position.

28. The locking clamp of claim 25, wherein the outer surface of the key end further defines a raised ridge in cross-section that is configured to selectively a complementary raised edge defined in an inner surface of semi-circular ring structure of the locking member, and wherein the respective raised ridge and raised edge are complementarily positioned relative to each other in an over centered position when the locking member is rotated relative to the key end and reaches the unlocked position.

29. The locking clamp of claim 25, wherein the locking member further comprises an elongate leverage member that extends upwardly and away from the locking member intermediate the respective fore and rear portions, and wherein the leverage member is spaced from and overlies the rear portion of the locking member.

30. The locking clamp of claim 25, wherein the rear portion of the locking member defines a cap structure that is configured to selectively block the opening defined by the hook of the proximal end portion of the base member, wherein, when the locking clamp is positioned in the locked position, the cap structure is positioned in contact with a portion of the tip of the hook and selectively encapsulates the channel through which a portion of the tensioning cable can pass, and wherein, when the locking clamp is positioned in the unlocked position, the cap structure is spaced away from the hook and the tensioning cable can be selectively removed from the channel.

31. A locking clamp for use in a cable tensioning system having a tensioning cable, the locking clamp comprising:
   a base member comprising a top elongate armature and a bottom elongate armature, wherein the bottom armature has a proximal end portion and a distal end portion, wherein the bottom armature is integrally connected to the top armature at a juncture that is intermediate the proximal end portion and the distal end portion of the bottom armature, wherein the proximal end portion of the base member has a hook shape in cross-section that defines a channel through which a portion of a tensioning cable can pass, wherein the top armature of the base member extends outwardly from the juncture to a key end that has a semi-circular ring shape in cross-section that defines an angular gap that is oriented toward the distal end portion of the bottom armature, and wherein at least portion the base member defines a first grasping surface;
   an elongate tongue member rotatively coupled to a first portion of the base member and defining a second grasping surface, and
   a locking member that is rotatively coupled to a second portion of the base member and that is configured to selectively rotate the tongue member to urge at least a portion of the second grasping surface of the tongue member into engageable contact with the first grasping surface of the base member, wherein the locking member comprises a fore portion and a rear portion, wherein the fore portion of the locking member has a semi-circular ring structure in cross-section that defines a semi-circular opening that is configured for rotational movement about an outer surface of the key end of the top armature of the base member.

32. The locking clamp of claim 31, wherein at least a portion of a top surf ace of the distal end portion of the bottom armature defines the first grasping surface.

33. The locking clamp of claim 31, wherein the juncture defines a semi-circular opening in cross-section that further defines an angular gap, and wherein the bottom armature is positioned at an acute angle a relative to the top armature and has a substantially "V" shape.

34. The locking clamp of claim 31, wherein the top armature has a shoulder member that extends from an inward surface of the top armature toward the distal end portion of the bottom armature, and wherein the shoulder member and a portion of the key end define a guide channel.

35. The locking clamp of claim 33, wherein the tongue member comprises a distal end portion and a proximal end portion, wherein at least a portion of a bottom surface of the distal end portion of the tongue member defines a second grasping surface, and wherein the proximal end portion of the tongue member has a semi-circular ring structure in cross-section that is configured for rotative mounting therein the semi-circular opening defined in the juncture of the base member, and wherein the tongue member is configured to be selectively rotatively moved relative to the bottom armature of the base member about and between an open position, in which the second grasping surface of the tongue member is spaced from the first grasping of the base member, and a closed position, in which at least a portion of the second grasping surface of the tongue member is in contact with or otherwise positioned in operative engaging relationship with at least a portion of the first grasping surface of the base member.

36. The locking clamp of claim 31, wherein the fore portion comprises an elongate actuation member that extends outwardly from a portion of the semi-circular ring structure to a distal contact end, wherein the locking member is selectively movable from an unlocked position, in which the distal contact end of the actuation member is not in contact with the top surface of the distal end portion of the tongue member, and a locked position, in which the distal contact end of the actuation member is in contact with the a portion of the top surface of the of the distal end portion of the tongue member and the tongue member is urged to the closed position, and wherein, in the locked position, the actuation member is positioned in an over center orientation with respect to the top surface of the of the distal end portion of the tongue member such that the locking clamp, under the bias forces exerted by the operatively coupled base member, is urged to remain in the locked position barring application of an external force to the locking member.

37. The locking clamp of claim 36, wherein the tongue member has a male protrusion extending toward the distal end portion from a top surface of the tongue member near the proximal end portion, and wherein, as the locking member is selectively rotated away from the locked position to the unlocked position, portions of the actuation member contact the male protrusion of the tongue member to urge the tongue member from the closed position to the open position.

38. The locking clamp of claim 37, wherein the outer surface of the key end further defines a raised ridge in cross-section that is configured to selectively a complementary raised edge defined in an inner surface of semi-circular ring structure of the locking member, and wherein the respective raised ridge and raised edge are complementarily positioned relative to each other in an over centered position when the locking member is rotated relative to the key end and reaches the unlocked position.

39. The locking clamp of claim 37, wherein the locking member further comprises an elongate leverage member that extends upwardly and away from the locking member intermediate the respective fore and rear portions, and wherein the leverage member is spaced from and overlies the rear portion of the locking member, wherein the rear portion of the locking member defines a cap structure that is configured to selectively block the opening defined by the hook of the proximal end portion of the base member, and wherein, when the locking clamp is positioned in the locked position, the cap structure is positioned in contact with a portion of the tip of the hook and selectively encapsulates the channel through which a portion of the tensioning cable can pass, and wherein, when the locking clamp is positioned in the unlocked position, the cap structure is spaced away from the hook and the tensioning cable can be selectively removed from the channel.

* * * * *